US008112401B2

(12) United States Patent
Blackwood et al.

(10) Patent No.: US 8,112,401 B2
(45) Date of Patent: Feb. 7, 2012

(54) ANALYZING EXTERNALLY GENERATED DOCUMENTS IN DOCUMENT MANAGEMENT SYSTEM

(75) Inventors: Lonnie Blackwood, Brentwood, TN (US); Marc Schiffrin, New Jersey, NJ (US); Richard Eckerstrom, New York, NY (US); Gordon Green, New York, NY (US)

(73) Assignee: Ecteon, Inc., New York, NY (US)

( * ) Notice: Subject to any disclaimer, the term of this patent is extended or adjusted under 35 U.S.C. 154(b) by 1454 days.

(21) Appl. No.: 11/138,842

(22) Filed: May 25, 2005

(65) Prior Publication Data

US 2006/0271519 A1    Nov. 30, 2006

(51) Int. Cl.
*G06F 17/30* (2006.01)
(52) U.S. Cl. ......................... 707/705; 707/711
(58) Field of Classification Search ............... 707/104.1, 707/100, 10, 711, 705, 790, 999.104
See application file for complete search history.

(56) References Cited

U.S. PATENT DOCUMENTS

| | | | |
|---|---|---|---|
| 5,557,780 A | | 9/1996 | Edwards et al. |
| 5,778,363 A * | | 7/1998 | Light ................................. 1/1 |
| 5,794,236 A * | | 8/1998 | Mehrle .............................. 1/1 |
| 5,832,470 A * | | 11/1998 | Morita et al. ..................... 1/1 |
| 5,909,570 A | | 6/1999 | Webber |
| 6,067,531 A | | 5/2000 | Hoyt et al. |
| 6,173,251 B1 * | | 1/2001 | Ito et al. ......................... 704/7 |
| 6,233,583 B1 * | | 5/2001 | Hoth ............................ 707/752 |
| 6,304,892 B1 | | 10/2001 | Bhoj et al. |
| 6,785,680 B1 * | | 8/2004 | Cragun ......................... 719/318 |
| 6,934,740 B1 * | | 8/2005 | Lawande et al. ............... 709/213 |
| 7,003,519 B1 * | | 2/2006 | Biettron et al. ................ 707/711 |
| 7,069,271 B1 * | | 6/2006 | Fadel et al. ................... 705/26.7 |
| 7,099,895 B2 * | | 8/2006 | Dempsey .............................. 1/1 |
| 7,403,901 B1 * | | 7/2008 | Carley et al. ....................... 705/2 |
| 7,519,607 B2 * | | 4/2009 | Anderson, IV ....................... 1/1 |
| 2001/0042083 A1 * | | 11/2001 | Saito et al. .................... 707/517 |
| 2002/0062318 A1 * | | 5/2002 | Pisani ........................... 707/100 |
| 2003/0018481 A1 | | 1/2003 | Zhou et al. |
| 2003/0074633 A1 | | 4/2003 | Boulmakoul et al. |
| 2003/0115188 A1 * | | 6/2003 | Srinivasa et al. .................. 707/3 |
| 2003/0128392 A1 | | 7/2003 | O'Brien et al. |
| 2003/0154071 A1 * | | 8/2003 | Shreve .............................. 704/9 |
| 2004/0060005 A1 | | 3/2004 | Vasey |
| 2004/0103090 A1 * | | 5/2004 | Dogl et al. ........................ 707/3 |
| 2004/0260679 A1 * | | 12/2004 | Best et al. ......................... 707/3 |
| 2006/0004561 A1 * | | 1/2006 | Zhang et al. ...................... 704/4 |

* cited by examiner

*Primary Examiner* — Eliyah S Harper
(74) *Attorney, Agent, or Firm* — Robert L. Epstein; Epstein Drangel LLP (57) ABSTRACT

The document management system has a Native Template database including a list of templates for one or more types of documents having common characteristics and a Conversion Database including a list of one or more data points associated with each listed document type, one or more descriptive text entries associated with each listed data point, and proximity range information relating to the location of the data point within the descriptive text. The locations of words, sentences, paragraphs, and sections within the externally generated document are recorded and a document type is selected from the Native Template database that has common characteristics. A data point is selected from the template and the introduced document is searched for Possible Data Points. A determination is made as to whether Possible Data Point values are located within a Proximity Range. A cumulative Evaluation Score is calculated for each Possible Data Point value. The Possible Data Point with the highest score is recorded. These steps are repeated until each data point has been selected.

29 Claims, 8 Drawing Sheets

ANALYZING EXTERNALLY GENERATED DOCUMENTS IN DOCUMENT MANAGEMENT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A PROGRAM LISTING APPENDIX SUBMITTED ON COMPACT DISC

Not Applicable

BACKGROUND OF THE INVENTION

The present invention relates to computer-implemented document management systems and more particularly to a method for analyzing externally generated documents for use in such a system.

1. Field of the Invention

Business and government processes are based on agreements—between buyer and seller; producer, middleman, and user; prime contractors and subcontractors; employer and employee, etc. Those agreements are usually memorialized as written contracts. Such contracts tend to be written in a specialized language of legal terms developed over many decades of legal practice and terms of art that have become specially defined over time during the development of particular business environments. In recent years, businesses have begun to move from paper-based contracts to agreements that are negotiated, created, e-signed, administered and archived using computers ("digitized contracts").

Unlike some other types of documents, where a text search using standard text searching algorithms provides sufficiently accurate access to elements of the document, the information required of a contract is usually a finely granular data point required for a specific use. A single contract data element is narrowly and uniquely determined by physical location and descriptive text modifiers within the contract.

For example, searching for "royalty rate" in a sound recording agreement is not sufficient—the correct royalty rate to be found might be for a specific song recorded in a specific option term, sold in a specific territory, incorporating a specific sales volume escalation, for one specific payee among many, depending on the date of the use, etc. Accessing such information requires each significant piece of data, and often information about its links to other data, to be identified, which can be done using "metadata tags", which specifically define each data element.

2. Description of Prior Art Including Information Disclosed Under 37 CFR 1.97 and 1.98

Although contracts can be one-of-a-kind documents created for a special situation (e.g., building a piece of a space shuttle), most contracts address recurring problems, for example real estate leases or non-disclosure agreements. Because all instances of contracts within a contract "type" are addressing the same problem, they tend to be made up of similar data elements, i.e., the metadata tags are the same. The variability between any two instances of contract types is found in the order in which the elements are presented, the words used to name, describe or modify the various data elements, and in the values assigned to any data element.

The collection of "metadata tags" for a certain "type" of agreement forms a "template" for that type of agreement. That is, the template will contain the data elements usually found in the particular type of agreement, although perhaps in a different order from the original document. Many computer-based contract creation processes rely on a template-based system, from which actual agreements can be generated and/or interpreted from a pre-existing template mapping to the particular type of agreement.

In those systems, a practical difficulty arises in analyzing and/or administering contracts when a user encounters a contract that was generated without reference to his system's own template ("native template") for that type of agreement. Commonly this situation occurs in the form of a contract that another party to an agreement has created using his own template ("foreign template").

We are aware of several patents and patent publications that relate to the same general subject matter as the present invention. However, none of those references teach a system with the capabilities of the present invention. In particular, none teach a method for analyzing documents, such as contracts, generated using a template foreign to the system that is managing the documents.

U.S. Pat. No. 5,909,570 entitled "Template Mapping System for Data Translation," issued to Webber on Jun. 1, 1999, describes a method for translating ("mapping") from an incoming dataset into a second format. It is demonstrated in terms of an EDI message format (a well defined data protocol, which uses segment markers to define the meaning and boundary of each data element), although it claims that it would work for non-EDI formats as well. In either case, however, the incoming data is highly structured. The incoming format structure, in terms of fixed data location, is generally pre-known, although possibly incompletely known.

However, and key to the system disclosed in the Webber patent, the incoming format structure (logical layout) must be completely known via accompanying components, which take the form of 1) mapping template rules, and 2) table field layouts (i.e., field names and sizes in bytes, etc.). The system builds and uses SQL queries to process the records of the incoming data and extract the data based on the given table field layouts. Then, using a user-defined mapping, a second file is built in a second format, and the data is placed into the second format.

A second aspect of the system disclosed in the Webber patent is a method for allowing a non-technical user to develop a mapping from the known format of the incoming data to an arbitrary second format using (so-called) non-programming, "macro" style commands.

By way of contrast, the present invention addresses specifically incoming data files whose structure is previously unknown to the system, either by physical layout or by logical table layout (i.e., database field names). Further, to the extent the incoming data set of the present invention has any structure, it is not a table structure specifically developed with data processing in mind, as in the Webber patent, but instead is a text document intended for human processing.

In addition, the Webber patent does not have the "learning" capabilities of the present invention which enable the system to become increasingly more accurate as more and more documents of a particular type are processed. Further, the system of the present invention is not limited to SQL or other database-style lookup commands in working with the second document. It is based on a full-text search lookup.

U.S. Pat. No. 5,557,780 entitled "Electronic Data Interchange System for Managing Non-Standard Data," issued to Edwards et al. on Sep. 17, 1996, relates to EDI data exchange. That patent describes a system that attempts to handle an incoming dataset that is in an unknown format. It does so by trying various other predefined formats, which is has stored in a database, which might apply to that type of EDI document to see if any fit. Such formats are defined by reading EDI-protocol defined data segment identifiers, unique alphanumeric code starting characters, and a segment terminator.

This Edwards et al. process is not really comparable at all to the present invention, except that, at a very basic level, both try to parse a new document of unknown format and both employ a pattern matching of characters (i.e., a most basic computer operation).

Edwards et al. assumes that the incoming dataset does have a template/pattern, and that template/pattern is in accordance with pre-established EDI-protocols, and the pattern has been previously mapped out and entered into the pattern database. The process simply needs to find the correct pattern by trying each in sequence and evaluating which one works.

An important feature of the present invention is that it assumes that the foreign document has no previously mapped out pattern that itself requires accordance with a predefined protocol. The template/pattern in Edwards et al. is defined in terms of computer-specific codes, and a limited, strict defined format, not natural/contract language in an unlimited prose format, as in our invention.

U.S. Pat. No. 6,067,531 entitled "Automated Contract Negotiator/Generation System and Method," issued to Hoyt et al. on May 23, 2000, describes a process for negotiating and generating a contract between multiple parties. It requires access to a database of contract components distributed among several users, who are able to assemble a contract based on their respectively assigned access levels. It discloses using a point system to control access to optional contract components. Also, it employs various web technology and (Graphical User Interfaces) GUI's for accomplishing the processes.

The system described in the Hoyt et al. patent bears no relevance to the system of the present invention other than the fact that both involve manipulating contracts via computer.

U.S. Pat. No. 6,304,892 entitled "Management System for Selective Data Exchanges Across Federated Environments," issued to Bhoj et al. on Oct. 16, 2001, describes a process for managing a computer network and services via referral to a database of Service Level Agreement terms.

The Bhoj et al. system is not relevant to the present invention. Although the process does parse a contract, put the data into a computer-readable form, and then act on that data to manage computer networks, the parsing process is not a focus of the Bhoj et al. patent.

Patent Application Publication No. 2003/0018481, entitled "Method and Apparatus for Generating Configurable Documents," Zhou et al. applicants, describes a process for generating a contract from template. It distinguishes between text components and "compensation" components, which may be combined in a generated document.

Except for the fact that the Zhou et al. system represents a contract via a "template", it is not related to the present invention.

Patent Application Publication No. 2003/0074633, entitled "Apparatus and Methods for Generating a Contract," Boulmakoul et al. applicants, describes a process for generating variations of a contract for different markets (i.e., different countries) that, via a system of rules, automatically makes sure that the variant contract conforms to the rules of the new country. For example, if a certain clause is required in a contract in a particular country, the system makes sure it is included. It has nothing to do with the present invention, although it does discuss automated contract elements.

Patent Application Publication No. 2004/0060005 entitled "Systems, Methods and Computer Programs For Analysis, Clarification Reporting On and Generation of Master Documents For Use in Automated Document Generation," Vasey applicant, describes a method dealing generally with legal documents, including contracts.

The Vasey process works with legal documents that are 'semantically identical although syntactically different," which is the focus of the present invention. The objective of the Vasey disclosure is to ensure that no errors are present in the computer representation of a type of document so that it is suitable for further processing not closely supervised by human expert assistance. The objective of the present invention is to provide just a "rough cut' of completely unformatted data, with many errors a given. The difference is that Vasey starts with a document already highly formatted (in a style meaningful to a computer) while the present invention starts with a document with no such formatting; in other words, well upstream from the Vasey starting place.

The Vasey system specifically includes both (1) "data representing a first mark-up notation or style" and (2) "data representing a second mark-up notation or style" and (3) "data representing a . . . document written in the first mark-up notation of style." In other words, in Vasey, the format of the documents is already well known before the document can be used by the system and is translated into a pre-defined format meaningful to a computer.

That is a fundamental difference between Vasey and the present invention. The focus of present invention is to provide the ability to address specifically pure text (i.e., no mark-up notation) documents whose format is completely unknown.

To the extent that a "mapping" exists in Vasey, Vasey envisions "meta-level definition of types" as a pre-requisite. Since this meta-level description is precisely what is missing in the document to be analyzed in the system of the present invention, no such mapping is possible.

Further, Vasey uses as its basic analysis technology text characters (meta-level tags "outside" the non-technical use of the document) whose main purpose is functional regarding the form of the documents. In the present invention, the actual words of the document are employed as operators, although it, since it is a computer, matches those meanings on an exact character to character (non-denotional) basis to make a match.

It is, therefore a prime object of the present invention to provide a method for analyzing externally generated documents in a document management system that is capable of parsing plain text documents, that is, documents that have not been previously been "marked-up" or set out in database or machine friendly format or are accompanied by descriptions of the physical location of data or otherwise formatted or pre-analyzed with computer interaction or machine processing in mind.

It is another object of the present invention to provide a method for analyzing externally generated documents in a document management system that employs recognition of text coincidence, which acts as a form of connotative "meaning" of actual text.

It is another object of the present invention to provide a method for analyzing externally generated documents in a document management system that recognizes that certain special use documents (e.g. business contracts) can often be sorted into types or families of documents with a common purpose, each of which uses a relatively limited and specialized vocabulary, and that a text translation process can take advantage of that circumstance.

It is still another object of the present invention to provide a method for analyzing externally generated documents in a document management system that includes a technique for using a document's structure and section topic headers as elements in determining the meaning of the document.

It is still another object of the present invention to provide a method for analyzing externally generated documents in a document management system that weighs multiple elements of meaningful text inherent in the types of documents targeted, including various synonymic descriptors, variety of proximal domains, and evaluation of expected range or allowed data elements, to develop a weighted probability of the most likely location of document elements.

It is still another object of the present invention to provide a method for analyzing externally generated documents in a document management system that has the capacity to "learn" over multiple exposures to additional similar documents to increase its ability to recognize a previously unseen variation.

BRIEF SUMMARY OF THE INVENTION

The present invention relates to a multiple step computer-implemented method for addressing the problem of efficiently linking a document created using a foreign template to a native template, and the native template's own document management system, for multiple variations of a "type" of legal document, such as a contract. Key to the approach utilized by the invention is the recognition that: 1) there exist similar types of documents (i.e., same templates), which address similar data points but name and locate those data points in different places; 2) the use of a varying, but fairly limited number of terms of art particular to a business to name data points; and 3) the possibility of "teaching" a system, over multiple exposures to a variations of a particular document type, the common terms associated with specific data points in the documents.

The present invention has been developed for use with a computerized document management system that includes a memory capable of storing a database consisting of each data point in a document template. Each data point is linked to and identified by its own, unique metadata tag. Such a metadata tag might include a description of the purpose of the data, its format, its links to other document data, and how it might be reconstituted into a full-text format document.

In the present invention, a separate database, referred to as the "Conversion Database," is also present in the system. The template data points in their database are linked one to many to records in the Conversion Database, by template and by parallel data point.

For each data point which is to be located in a foreign, that is, externally generated document, the Conversion Database has potentially several records with fields: (a) identifying text that can be expected to be found in the externally generated document near the data point ("Descriptive Text"); (b) describing where the data point is likely to be found in relation to each element of the Descriptive Text ("Proximity"); (c) defining the type of the data point ("Data Type"); (d) defining a range of values associated with the data point ("Expected Value Range"); and (e) identifying the paragraph header(s) in the externally generated document in which the data point would be likely to be found ("Section Topic Header").

After the Conversion Database is constructed, a "teaching" or set-up phase of the method of the present invention is commenced. During that stage, a document is read into the system, indexed, and compared to a native template with similar characteristics (the same Document Type) selected from the native template database. The user identifies a data point within the document and assigns it to a template data field. At this time the system saves a default set of Descriptive Text elements that describe the sentence, paragraph, and section context of the data point for comparison to future documents. Additionally, the user may mark accompanying text as Descriptive Text and assign it a Proximity value relative to the current data point. He will then choose a Data Type, an Expected Value Range (if appropriate), and Section Topic Header(s) to be associated with the identified data point. (Similar to the Descriptive Text, the Section Topic Header may have more than one word or set of words linked to the same data point.) This is done for each data point in the document. In this way, the user "teaches" the system how a specific variation of a document of the same Document Type ties to a template.

After entering several different examples of a Document Type in this way, the system of the present invention is able to analyze an example of that type of document that it has not previously encountered and is able to recognize many of the data points in that document by matching some combination of those patterns.

The system is then ready to analyze externally generated documents. The externally generated document is introduced into the system. The user will identify the Document Type of the externally generated document and select from the Native Template database a template for that Document Type. The user will also identify whether the document has Section Topic Headers.

The system will then begin to parse the document to be analyzed. The system will begin by indexing the word, sentence, paragraph, and heading locations. If the document has been identified as using Section Topic Headers, the system will identify and temporarily record the paragraph numbering scheme. The system will also temporarily store the location of all text from the end of the Section Topic Header until the start of the next Section Topic Header at the same level of hierarchy numbering.

The system will then begin to step through each data point in the selected Template sequentially and locate all the Possible Data Point values in the document using regular expressions (patterns of characters) specific to the Data Type of the data point. Next, it will optionally locate the Section Topic Header data for each Possible Data Point. It will then search the document for Descriptive Text associated with the data point, and use the Proximity data to review the text within the Proximity range. When a match is identified, it will be recorded and a score will be assigned so each Possible Data Point value is assigned a rank based on its Proximity to the descriptive text and placement within a section topic header, and whether or not the section headers are determined to be within a "regular hierarchy" or, with less value, to be within an "incomplete hierarchy", or with least value, within an "cannot determine hierarchy."

The system will then move on to the next template data point and repeat the process of analyzing the document, until it has reviewed all data points.

The above described steps will give a rough indication of where the data from the externally generated document fits into a Native Template. Because of the exacting requirements necessary to identify document data for reliable use, the user will usually need to review the data to confirm or correct the identification. When a data point value is confirmed, information about its context will be recorded to improve the ranking of the Possible Data Point values in future documents without user intervention.

In this manner, the method of the present invention provides the user with a template that is "filled in" for the externally generated document. The user may at this point even be able to recreate a native text version of the externally generated document with the same meaning as the externally generated version, but created using his preferred language and format.

In accordance with one aspect of the present invention, a computer-implemented method for analyzing an externally generated document is provided for use in a document management system. The system has a Native Template database including a list of templates for one or more types of documents having common characteristics. It also has a Conversion Database including a list of one or more data points associated with each listed document type, one or more descriptive text entries associated with each listed data point, and Proximity range information relating to the location of the data point within the descriptive text. The method includes the step of introducing the externally generated document into the system. A template of a document type that has characteristics in common with the externally generated document is selected from the Native Template database. A data point is selected from the template. The introduced document is indexed and searched for descriptive text associated with the selected data point. The Proximity range information for the selected data point is obtained from the Conversion Database. A determination is made as to whether the selected data point is located within the Proximity range of the Descriptive Text. The Possible Data Point value and location is recorded, and a starting numerical score is assigned to it. The score is incremented for each Proximity criterion the Possible Data Point value meets. If appropriate, an Expected Value range is assigned to the selected data point, and the score again incremented if the value falls within the range. The preceding steps are repeated until each data point in the template has been selected.

For documents that are more hierarchical in structure, the method also includes the steps of reviewing the introduced document, identifying and storing hierarchical Section Topic Headers from the document and incrementing the score if the Possible Data Point is within the appropriate section header in the Conversion Database. Otherwise, the non-hierarchical heading Proximity value is used.

The method further includes the steps of reviewing the introduced document and identifying and classifying the numbering/lettering system used therein.

The method also includes the steps of refining the search of the introduced document using descriptive text associated with the text under the data point's section topic header.

The method also includes the step of assigning a preference to the descriptive text with the highest numerical score, if the text associated with the selected data point is located in more than one location in the introduced document.

After the introduced document is analyzed and the data points are recorded, the recorded data points are presented to the user for review. The user then has the ability to approve, modify or reject each of the recorded data points.

The method further includes the step of setting up the system to determine how a specific variation of a document relates to a template. That is achieved by introducing a set-up document of the type associated with the template into the system.

The user is presented with the set-up document and template simultaneously. The user selects a data point from the template. He then assigns the selected data point to a field in the Conversion Database, associates the text accompanying the selected data point with the selected data point in the assigned Conversion Database field, and assigns Proximity range information and a data type to the selected data point in the Conversion Database. Those steps are repeated for each data point selected in the set-up document.

Preferably, multiple set-up documents are introduced into the system during the set-up phase by repeating the above steps for each set-up document.

The method further includes the step of assigning a hierarchical section topic header to the selected data point in the Conversion Database.

The steps of identifying and storing the section headers include identifying stand-alone paragraphs in the introduced document of less than a given number of words and marking each such identified stand-alone paragraph as a section header. Those steps may also include identifying paragraphs having starting words preceded by some commonly used symbol, such as "§", or followed by, for example, a hyphen or colon, and marking each such identified paragraph as a section header. They may further include identifying a word or words with no period, identifying first character capitalized words, identifying all bolded words; and determining the frequency of occurrence of same in the introduced document.

The step of identifying and classifying the numbering/lettering system used in the introduced document includes recording the number or letter at the beginning of each paragraph in the introduced document, determining the hierarchy type used in the introduced document; and recording the hierarchy type determination in the Conversion Database.

In accordance with another aspect of the present invention, a computer-implemented method for analyzing an externally generated document is provided for use in a document management system. The system includes a Native Template database including a list of templates for one or more types of documents having common characteristics. It also includes a Conversion Database having a list of one or more data points associated with each listed document type, one or more descriptive text entries associated with each listed data point, and Proximity range information describing the location of the data point in relation to the descriptive text. The method begins by setting up the system to determine how a specific variation of a document relates to a template. Then, the externally generated document is introduced into the system. The introduced document is analyzed by selecting a template from the Native Template database relating to a document type that has characteristics in common with the introduced document. A data point is selected from the template. The introduced document is searched for patterns associated with the data type of the selected data point. The data point and the location of the associated text are recorded in the Conversion Database. Thereafter, the recorded data is presented to the user for review and such that the user can approve, modify or reject the presented data.

The method further includes the steps of reviewing the introduced document, identifying and storing hierarchical section headers in the introduced document and associating the selected data point with the text under the appropriate section header in the Conversion Database. The search of the document for descriptive text associated with the data point is optionally refined using the text under the associated section header. That is achieved by assigning a preference to the Possible Data Point with the highest numerical score if the text associated with the selected data point is located in more than one location in the introduced document.

The method also includes the steps of reviewing the introduced document and identifying and classifying the numbering/lettering system used therein.

The step of setting up the system includes introducing a set-up document of the type associated with the template into the system and presenting the user with the set-up document and template simultaneously. The user selects a data point from the template and assigns the selected data point to a field in the Conversion Database. He associates the text accompanying the selected data point with the selected data point in the assigned Conversion Database field and assigns Proximity range information and a data type to the selected data point in the Conversion Database. The preceding steps are repeated for each data point selected in the set-up document.

Preferably, multiple set-up documents are introduced into the system. The above identified set-up steps are repeated for each.

The method includes the step of assigning an Expected Value range to the selected data point in the Conversion Database. It also includes assigning a section topic header to the selected data point in the Conversion Database.

The steps of identifying and storing the section headers includes the steps of identifying stand-alone paragraphs in the introduced document of less than a given number of words and marking each such identified stand-alone paragraph as a section header. It also includes the steps of identifying paragraphs having starting words followed by a hyphen or colon and marking each such identified paragraph as a section header. That may also include identifying a paragraph of a limited number of words with no period, identifying first character capitalized words, identifying all bolded words; and determining the frequency of occurrence of same in the introduced document.

The steps of identifying and classifying the numbering/lettering system used therein includes recording the number or letter at the beginning of each paragraph in the introduced document, determining the hierarchy type used in the introduced document; and recording the hierarchy type determination in the Conversion Database.

BRIEF DESCRIPTION OF THE SEVERAL VIEWS OF DRAWINGS

To those, and to such other objects that may hereinafter appear, the present invention relates to a method for analyzing externally generated documents in a document management system, as described in detail in the following specification and recited in the annexed claims, taken together with the following drawings, in which like numerals refer to like parts, and in which:

DETAILED DESCRIPTION OF THE INVENTION

Although the invention is disclosed herein by way of example through the use of a description focused on legal documents, and in particular contracts, it should be understood that the present invention is applicable to many different types of documents having similar characteristics and/or purposes (e.g. corporate purchasing documents or confidentiality agreements) and should not be considered to be limited to contracts or legal documents.

Figure 1:
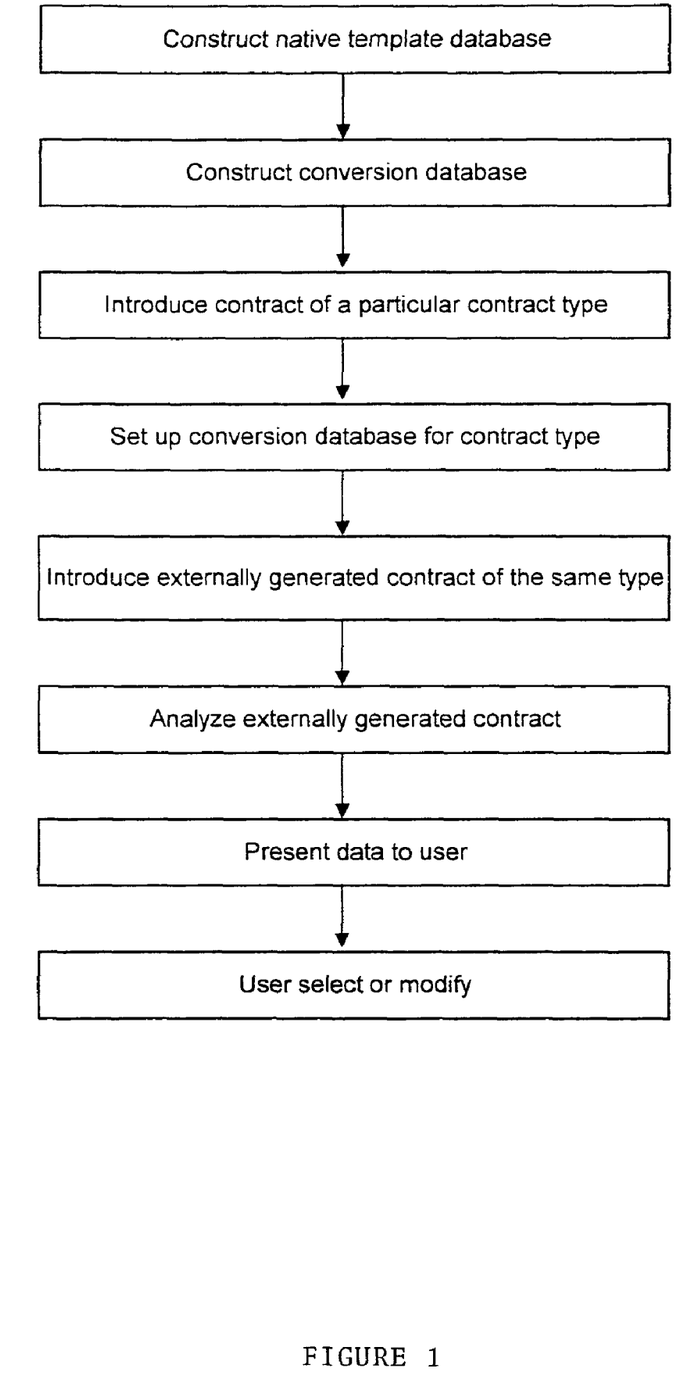
FIG. 1 is a flow chart illustrating the basic steps of the method of the present invention.

As illustrated in FIG. 1, the present invention is a system for analyzing externally generated contracts in a computer implemented contract management system that includes a database (referred to herein as the "Native Template" database) that includes a listing of different type contracts with common characteristics, for example, license agreements. Each contract type listing in the Native Database is associated with one or more "Data Points" that form a template for that type of contract. For example, a license agreement might include a Data Point for the contracting party, one for the start date of the agreement, one for the termination date, and the like.

Each Data Point in a contract template is listed in database tables and/or in a structured markup language, such as Extensible Markup Language (XML). Each data point is linked to and identified by its own, unique metadata, which might include a description of the purpose of the data, its format, its links to other contract data, and how it might be reconstituted into a full-text format contract. For example, the contracting party Data Point might be characterized as a "text" Data Point, whereas the start date Data Point could be considered to be a "date" Data Point.

A separate database, referred to herein as the "Conversion Database," is constructed and stored in the system. The template data points in their database table/XML markup are linked one to many to records in the Conversion Database, by template and by parallel data point.

For each data point which is to be located in a foreign, that is, externally generated contract, the Conversion Database has potentially several records with the following fields:

1) Descriptive Text, which is text that can be expected to be found in the contract document near the data point. Multiple examples of such text may be found for any one data point. For example, the word "terminate", "ends", "end date", "termination date", all might be linked in different agreements to the data point describing the end of the contract term, and would be separate Descriptive Text records for that data point.

2) A second field in the table, called "Proximity", describes for each element of Descriptive Text, where the data element is likely to be found in relation to the Descriptive Text. This is defined by a preposition, such as following, preceding, or within; and a scope value, such as sentence, paragraph, section, or heading. For example, the data may be "following in the same sentence", "preceding in the same sentence", "within the same paragraph", "within the same section", "in the preceding heading", and so on, or if not specifically defined, the Proximity will default to a broad range.

3) A third field tied to each Descriptive Text data point is Data Type, which might be "number", "date", "text", and so on Each Data Type has an associated set of regular expressions which are used to preliminarily locate the Possible Data Points within the text. These match a variety of date formats, numbers, spelled-out numbers, etc., and also locate textual elements such as state names, country names, capitalized phrases, address formats, and the like. If there are no matches for the regular expressions, a default expression that matches every word is used, and the system depends on the Descriptive Text Proximity and Section Header confidence rankings to determine the most likely location of the data point within the text.

4) Fields to capture Expected Value Range, either with fields for both ends of the range, or a list of permitted values, including values defined using wild card variable values within the whole value.

5) A field for Section Topic Header, which will identify, for contract documents which use paragraphs with hierarchical topic headers (e.g. "II.B.2.b.ii"), what the topic header (or headers) would be for the contract location in which the data point is most likely to be found. Potentially more than one Section Topic Header might be possible.

The Proximity and the Data Type entries are predefined so that they are meaningful to the computer software. The system will be able to recognize and translate text (written out) versions of data points such as numbers, dates, currencies, and percentages. The Conversion Database can be normalized into several separate tables, if appropriate.

Figure 2:
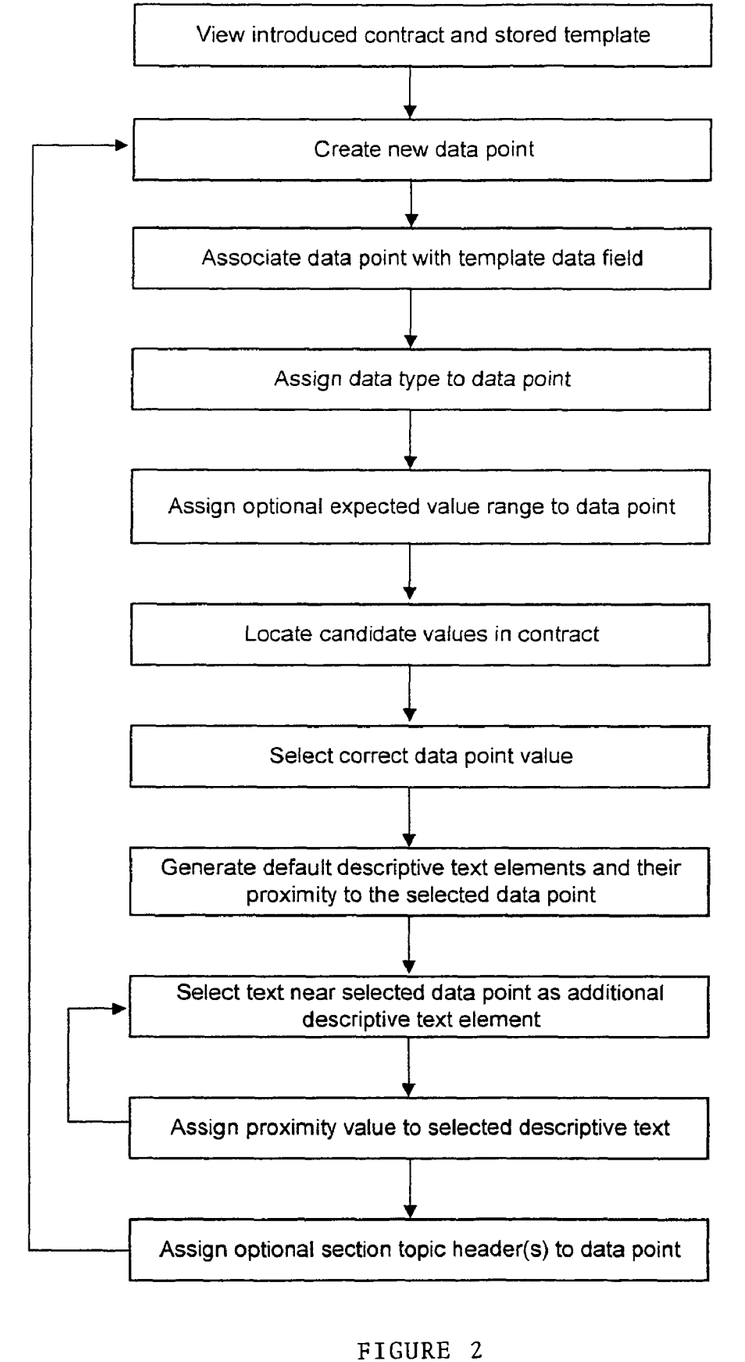
FIG. 2 is a flow chart illustrating the "set-up" portion of the method of the present invention.

After the Conversion Database is constructed, a "teaching" or set-up phase is commenced, as illustrated in FIG. 2. During this phase, a split screen/floating screen user interface will allow the user to simultaneously review an example of a contract (for example, a license agreement) that is introduced into the system for set-up purposes and a template relating to that type of contract selected from the Native Template database. The contract and template can be side-by-side on the screen or the contract can be "floating" over the template.

The user will mark with a pointing device a Data Point within the contract and assign it to a template data field, then mark the accompanying text and assign it to the appropriate Descriptive Text. He will then choose a Proximity value, a Data Type, an Expected Value Range (if appropriate), and an optional Section Topic Header. In this way, the user "teaches" the system how a specific variation of a contract ties to the template. This input could also be done by an experienced user without the use of an actual document to work from. The software stores default Descriptive Text using the words in the same sentence, paragraph, and section as the selected data point. If the user elects not to select any Descriptive Text, or when the user-defined descriptive text cannot be located in an incoming document, the system uses this information as the basis for a default ranking of candidate data point values.

More specifically, from the Conversion Database, a new Contract Type is defined or an already existing Contract Type is selected by the user. From the Native Template database, each Data Point included in the Contract Type template is selected in turn. Alternatively, the user may select a particular Data Point from the template that he wishes to work with.

The selected Data Point is highlighted by the user and entered directly into the Conversion Database or marked in the contract with a pointing device. The selected Data Point is associated with Descriptive Text that defines or is found near the Data Point.

The system will inform the user if the selected Descriptive Text has already been entered into the Conversion Database. If not, the user will enter it. If it is already present, the user will be given the option to continue or select the next Data Point.

The system will show the user a list of Prepositions and Values defined for the Proximity field in the Conversion Database for the user to select. The user indicates whether each of the listed Prepositions and Values defined for the Descriptive Text is "Specific" to and only applicable with that particular Descriptive Text or is "General" in that it is applicable for all of the Descriptive Text for the Data Point. In this way, the user assigns a Proximity Value to the Descriptive Text.

The user will assign a Data Type and an Expected Value Range to the Data Point. The user will then optionally enter one or more Section Topic Headers possible for the Data Point.

After introducing and entering several different examples of a Contract Type (for example, several different license agreements) in this way, the system of the present invention is able to analyze an example of that Contract type it has not yet seen and be able to recognize many of the Data Points in that externally generated contract by matching some combination of those patterns.

Figure 3:
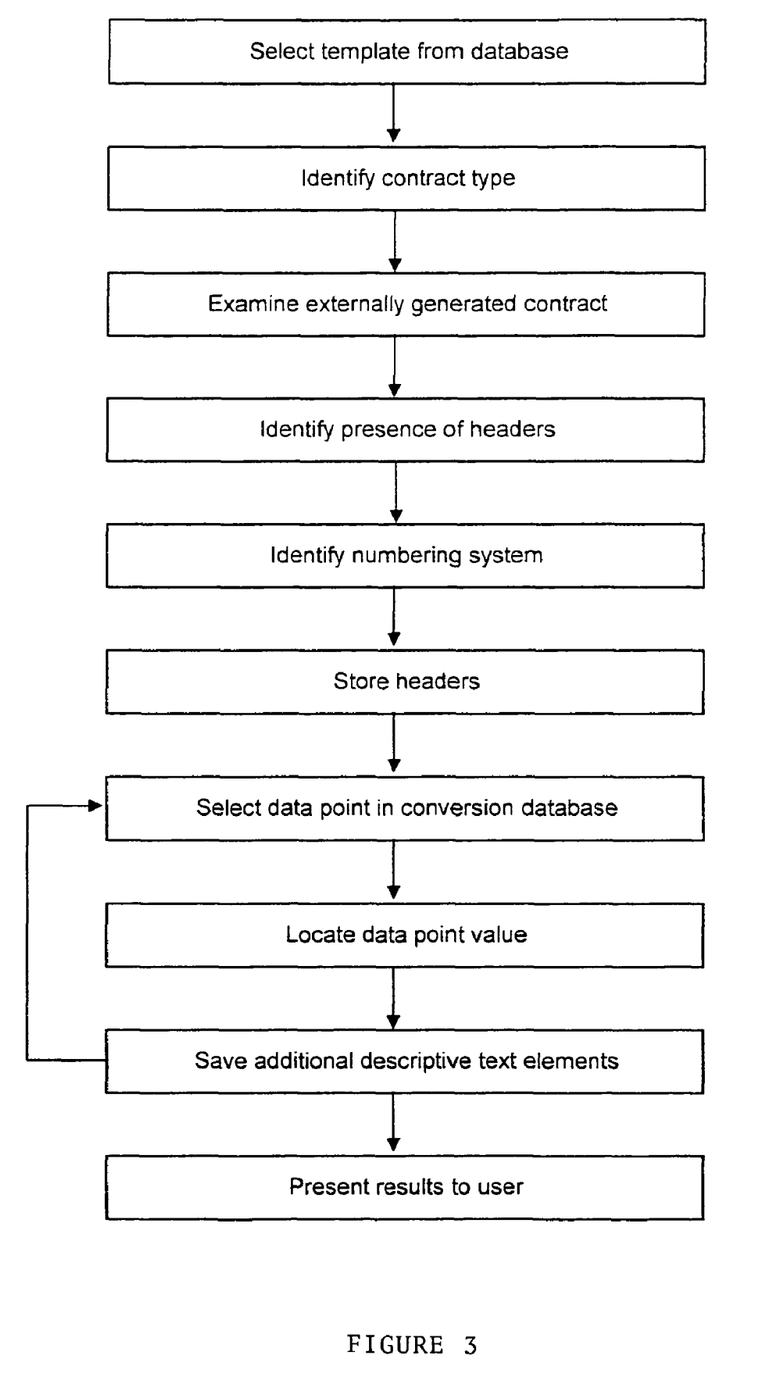
FIG. 3 is a flow chart illustrating the analysis portion of the method of the present invention.

Once the system has been taught (although the teaching process may be on-going), the system is ready to analyze externally generated documents. As illustrated in FIG. 3, in the analysis or read-in phase, after the externally generated contract to be analyzed has been introduced into the system, the user will select a template from the Native Template database that relates to the type of contract to be analyzed. This is done by identifying the type of contract being analyzed and selecting from the list of possible contract types in the Native Template database which contract type template is to be used (i.e. a template for license agreements). The user will also identify whether the contract uses Section Topic Headers.

Figure 7:
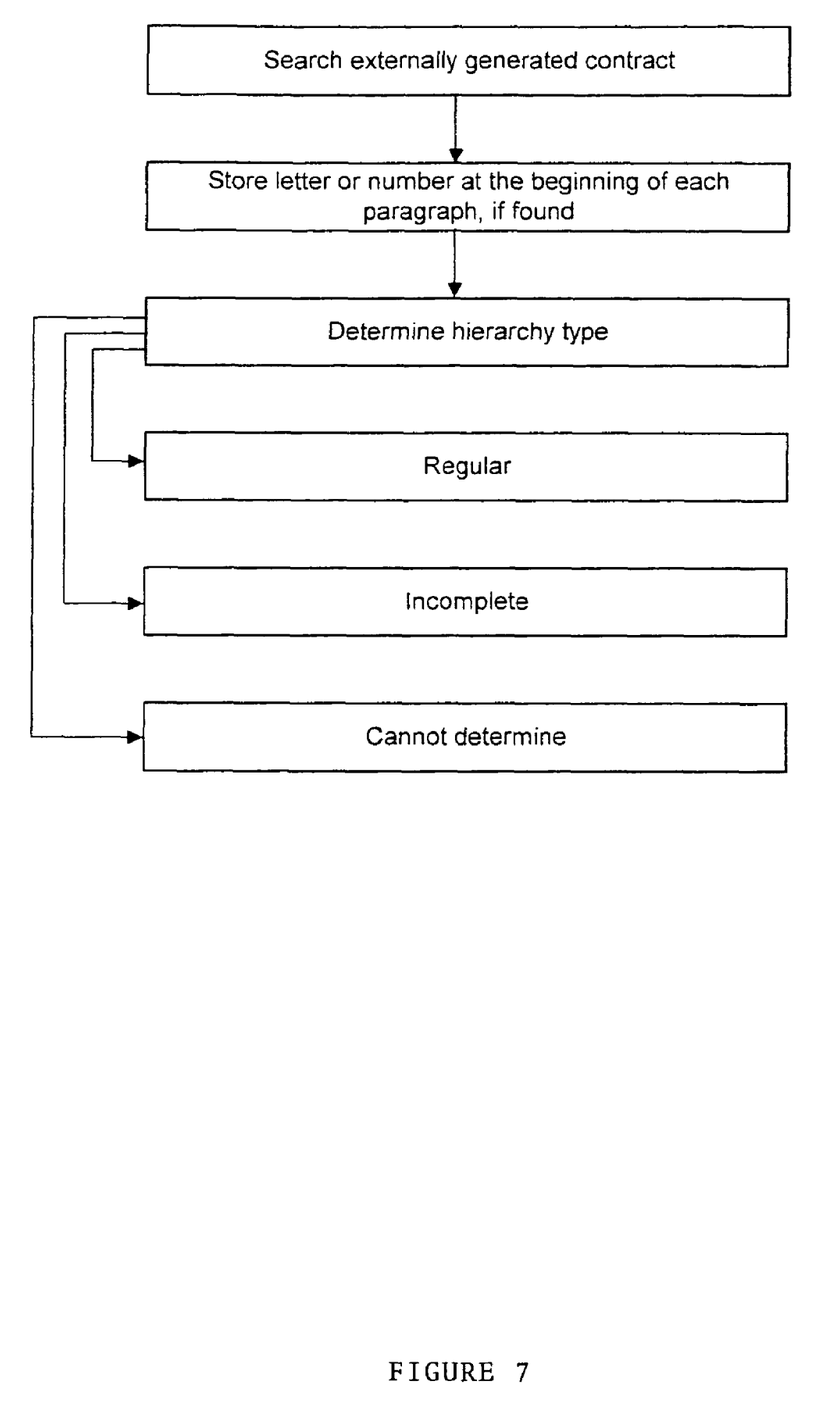
FIG. 7 is a flow chart illustrating the lettering/numbering determining portion of the method of the present invention.

The system will then begin to parse the contract to be analyzed. The system will begin by indexing the document, which consists of storing the locations of words, sentences, paragraphs and headings. Next, it will optionally identify and temporarily record the contract paragraph numbering scheme. This task will include determining the hierarchy of the numbering system, as illustrated in FIG. 7 and explained in detail below. The system will record if the Numbering Scheme is either inconsistent or there is no Numbering Scheme, and use that information in steps below where the Numbering Scheme is used.

Headings will be defined by the system or the user as a selected number of words following a number, which are then followed by an end of the sentence or by an end of paragraph marker. If a hierarchical structure is anticipated, the numbering scheme of the document is also inferred. If there is no end of sentence or end of paragraph marker within the given number of words, the paragraph is assumed not to be a Section Topic Header. The system will temporarily store the location of all text from the end of the Section Topic Header until the start of the next Section Topic Header at the same level of hierarchy numbering.

The system will then begin to step through each Data Point in the selected template sequentially.

Figure 4:
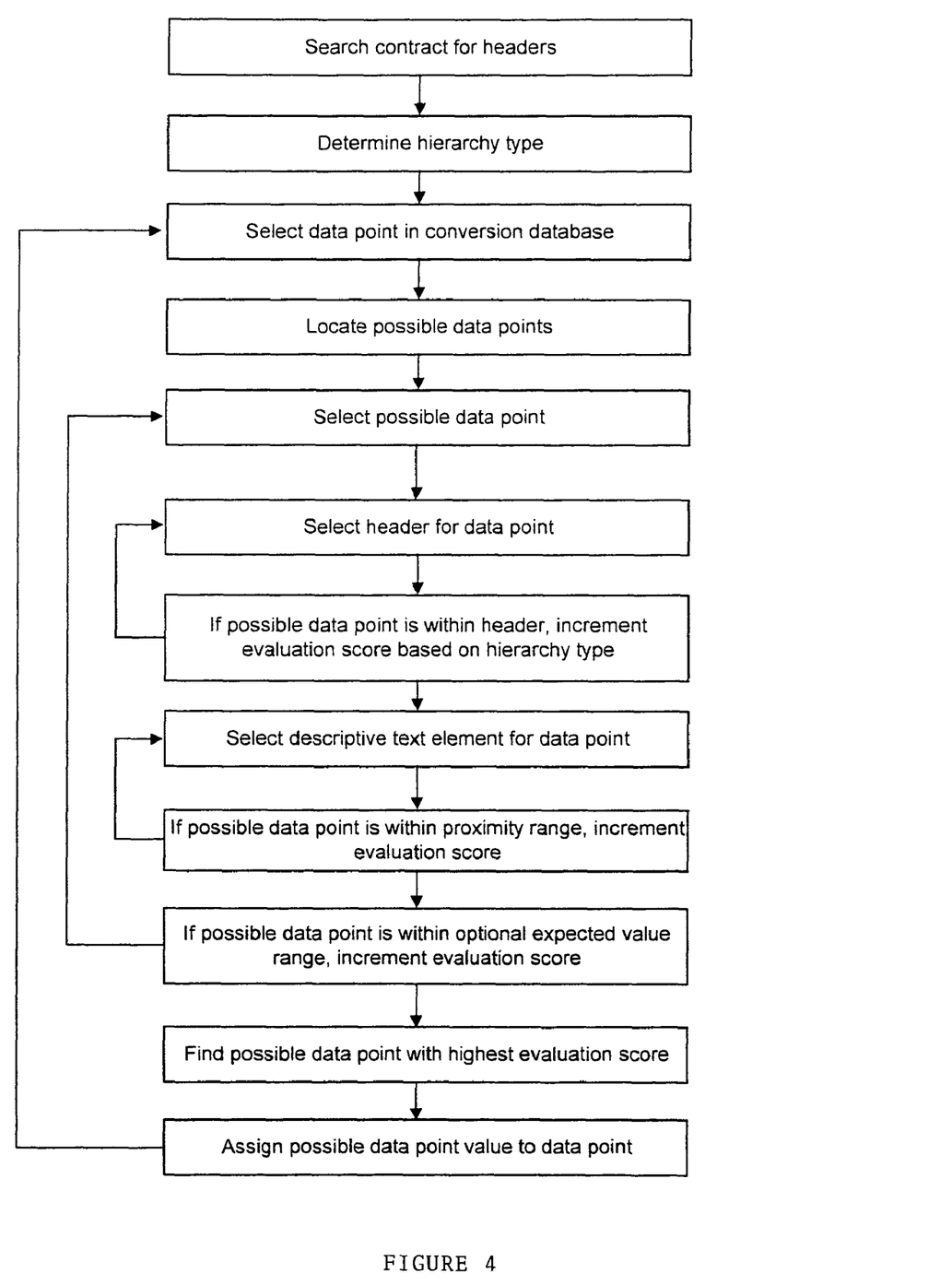
FIG. 4 is a flow chart illustrating a first optional document parsing portion of the method of the present invention.
Figure 5:
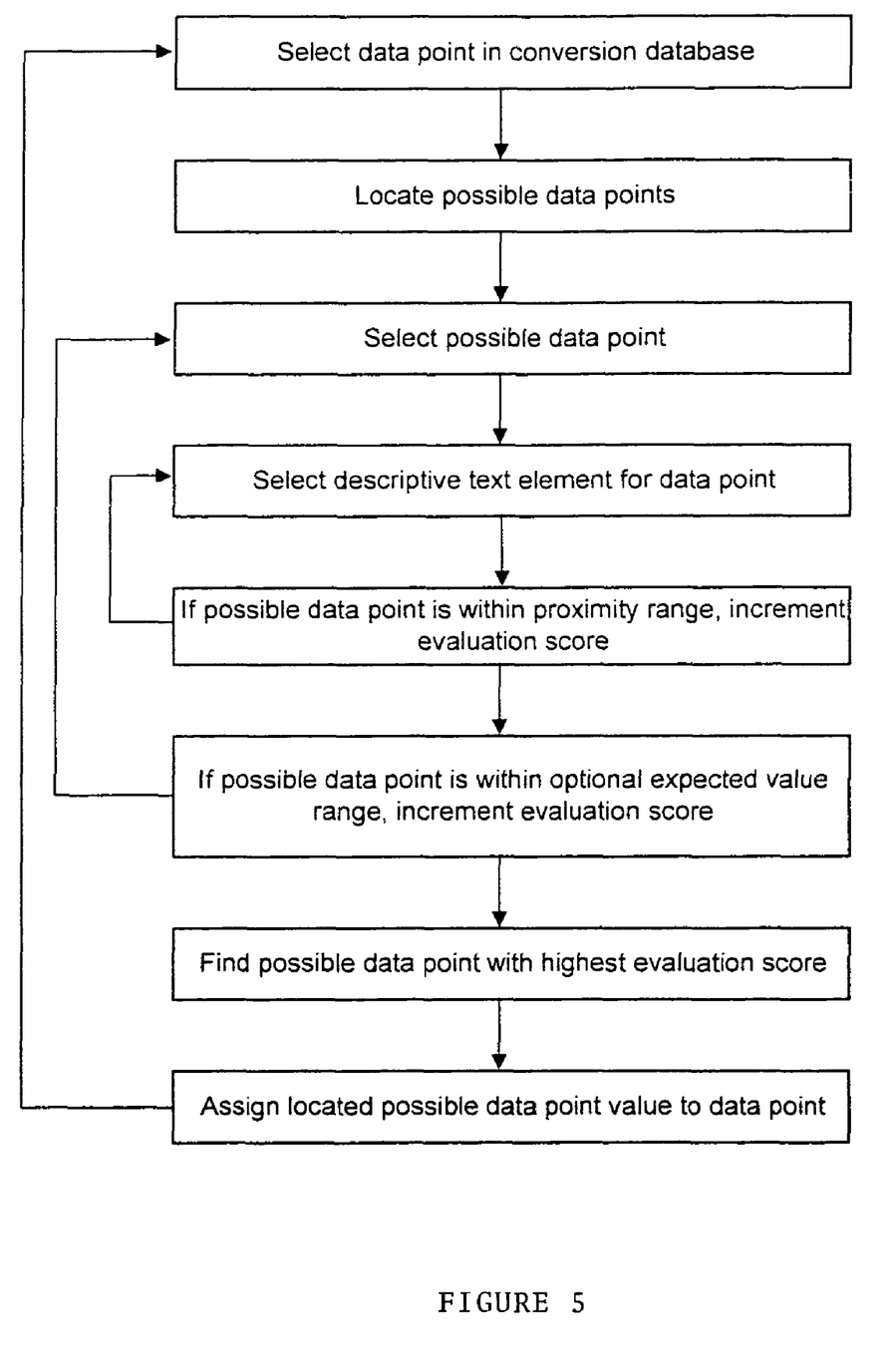
FIG. 5 is a flow chart illustrating a second optional document parsing portion of the method of the present invention.

The user may select the method of applying the hierarchical Section Topic Header data from two alternatives illustrated in FIGS. 4 and 5, respectively. As seen in FIG. 4, as a first selectable option for the user, for each template data point, if the template data point has Section Topic Header data, the system will first search the contract text for occurrences of any of the examples of the Section Topic Header. If a Section Topic Header is found, the system will increment the evaluation scores of the possible data points for those data points previously recorded in the Number Scheme analysis as belonging to that Section Topic Header. Alternatively, as shown in FIG. 5, the system will bypass this step.

The system will then locate all of the Possible Data Points and Descriptive Text occurrences within the document or range within the document, corresponding to the current Data Point. It will then iterate through the Possible Data Points and Descriptive Text occurrences and use the Proximity data to calculate a score for each Possible Data Point. The system will at that time translate if necessary from "written out" form to the template's standard form if the data is a number, date, etc. any data within the Proximity range. If the Possible Date Point falls within the Proximity criteria of its associated Descriptive Text, its score will be incremented. The score will also be incremented if the Possible Data Point falls within the Expected Value Range.

The system will also add a point to the score if the Possible Data Point is found within the pre-defined Section Header Topic range. If only one example of the combination of Descriptive Text and Data Type within the Proximity range has been found, the system will mark that data and that location as the target Data Point. If more than one example of the combination is found, the system will give preference to the first occurrence of the data and location that has the most points, but will continue to store other locations for a subsequent step described below.

The system will then move to the next template Data Point and continue the process of analyzing the document, until it has reviewed all data points.

More specifically, the analysis begins with the system presenting the Contract Type list to the user for the user to select the appropriate Contract Type template for the contract to be analyzed. The externally generated contract is examined, the lettering/numbering scheme in the contract is identified and the hierarchy is determined.

The contract is examined for hierarchical Section Topic Headers. If present, each Section Topic Header is marked and the domain of each is stored.

For the selected Contract Type template, each Data Point is selected in turn from the template. For each Data Point, a list of Possible Data Point values is located within the document using the regular expressions associated with Data Type of the Data Point. If none are found, every word in the text is considered a Possible Data Point. A starting numerical Evaluation Score of zero is assigned to each.

Next, each of the associated Descriptive Text entries for that Data Point is reviewed. For each Possible Data Point value located within the Proximity scope of the descriptive text, the range of the contract corresponding to the Proximity scope value is then searched for the Descriptive Text. If present, and its location relative to the Possible Data Point value corresponds to the Proximity preposition, the Evaluation Score of the Possible Data Point value is increased by a given number (for example x). If not present, the next possible value is selected and scored.

For example, if the Data Point is a date, all of the phrases in the document that could be dates are located and saved as Possible Data Point values. Each Descriptive Text record is then selected, and if the Possible Data Point is within the scope of the Descriptive Text, its location relative to the Descriptive Text matches the Preposition, its Evaluation Score is increased.

If a Possible Data Point is found, the system will, if necessary, convert to a non-textual type (e.g., date or number), and check to see if it is in the Expected Value Range. If it is, the Evaluation Score will be increased by a given number (for example m).

Within the field defined by Proximity Preposition and Value, a determination is made as to whether the Preposition is Specific to the particular Data Point or not. In this regard, it should be noted that the system can be made increasingly sophisticated by adding more detailed definitions as Proximity Prepositions into the database.

The system will then check to see if a Section Topic Header has been defined for the Possible Data Point by searching the Section Topic Header field for each Section Topic Header linked to the Descriptive Text. If the Section Topic Header is found, a check is made to see if the Possible Data Point is within the Section Topic Header domain. If it is, a given number (for example s) is added to the Evaluation Score. If the Hierarchy is listed as "incomplete" a number (for example t, which is less than s) is added to the score.

The system will then store the Data Point, the Descriptive Text, the Possible Data Point and the Possible Data Point location and the Evaluation Score in a Parsing Results table. Each Descriptive Text will be selected in turn and processed in the same manner.

If more than one Possible Data Point exists for a particular Data Point, then the any Possible Data Point with an Evaluation Score below a User Pre-defined Score Cut Off will be deleted. The user can control the sensitivity of the system by varying that cut off value.

After each Descriptive Text is processed for a particular Data Point, the results in the Parsing Results table for Possible Data Points with the highest Evaluation Scores are compared. The Possible Data Point with the highest score is assigned a proposed location and marked in the contract as a Data Point for the user to review and approve or reject.

As indicated previously, part of the analysis of the externally generated contract involves the identification of the numbering/lettering system used in the contract and the determination of a Hierarchy type for the contract. That portion of the process is illustrated in FIG. 7.

First, the externally generated contract is searched by the system for paragraphs beginning with a number or letter. Any that are located are stored. The system is set to default to hierarchy of numbering of capital roman numeral, number, capital letter, small roman numeral, small letter (i.e. I, 1, A, v, a) or decimal number system. The user can modify the hierarchy or add a new hierarchy.

The system will mark the domain of each number/letter as all of contract after hierarchy number/letter until the next number/letter of its level or higher is encountered. The system will automatically allow for the situation in which the text of the contract may not start until after several paragraphs using the word "whereas", or its equivalent, which may not be numbered or lettered.

If the system (a) recognizes a pre-defined numbering scheme, (b) the numbers are in order, (c) no higher level number/letter appears in the document for the first time after lower level number/letters have appeared, and (d) more than a given percent of paragraphs are numbered, then the Hierarchy is considered to be a "regular hierarchy." If (a), (b), (c) are present, but less than the given percent of paragraphs are numbered, then the Hierarchy is considered an "incomplete hierarchy." Otherwise, the system will default to "cannot determine hierarchy" category. The system may be set to alert the user to numbering/lettering hierarchy status, if desired.

Figure 6:
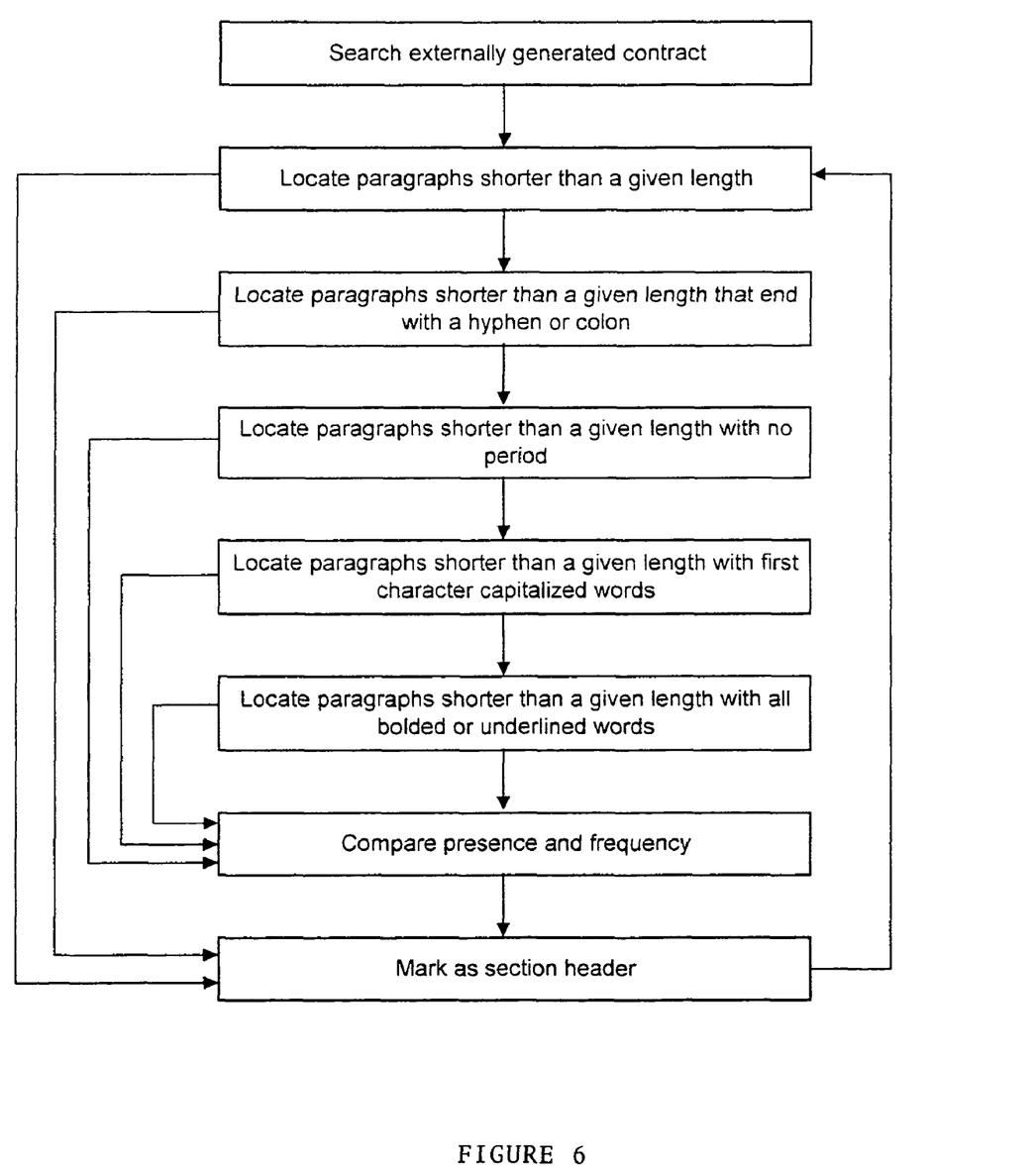
FIG. 6 is a flow chart illustrating the section topic header determining portion of the method of the present invention.

The portion of the analysis relating to the determination of the Section Topic Headers is illustrated in FIG. 6. In this portion of the method, the externally generated contract is searched by the system to locate (1) stand-alone paragraphs less than a given number (for example 10) of words long or (2) words starting a paragraph followed by a hyphen or colon, occurring multiple times in the contract, with (a) word or string of words without an ending period, or (b) all first-character capitalized words, or (c) words all bolded or in larger type font, any of those constructions occurring multiple times in the contract.

If the system finds either (1) or (2), and more strongly if (1) or (2) is combined with (a) (b) or (c), then those words are marked as a Section Topic Header. The domain of a Section Topic Header is determined to be either equal to the domain of the number associated with the Section Topic Header, or until the next Section Topic Header is marked.

The above described steps will give a "first cut" of where the externally generated contract data fits into a Native Template. Because of the exacting requirements necessary to identify contract data for reliable use, the user will usually need to examine the data to confirm or correct the identification.

Once the system has attempted to parse an externally generated contract using the steps described above, it will present its results to the user in either the form of the Native Template listing, with data from the contract filled in, or in the text form, with the, for example, XML fields that have been identified marked for the user. Those fields whose Evaluation Score is high (matching Data Type, Topic Header, Expected Value Range) will be displayed in a way to show the user the software's relatively high confidence (e.g., have a special font, background color, or other effect). Those of lesser confidence will have a different display (e.g. a different font or color background). The user is able to select either type (data listing or structured markup full text) of display to work with. A listing of the Native Template data fields will also be visible on the screen, either as a split screen, or as a floating screen.

Figure 8:
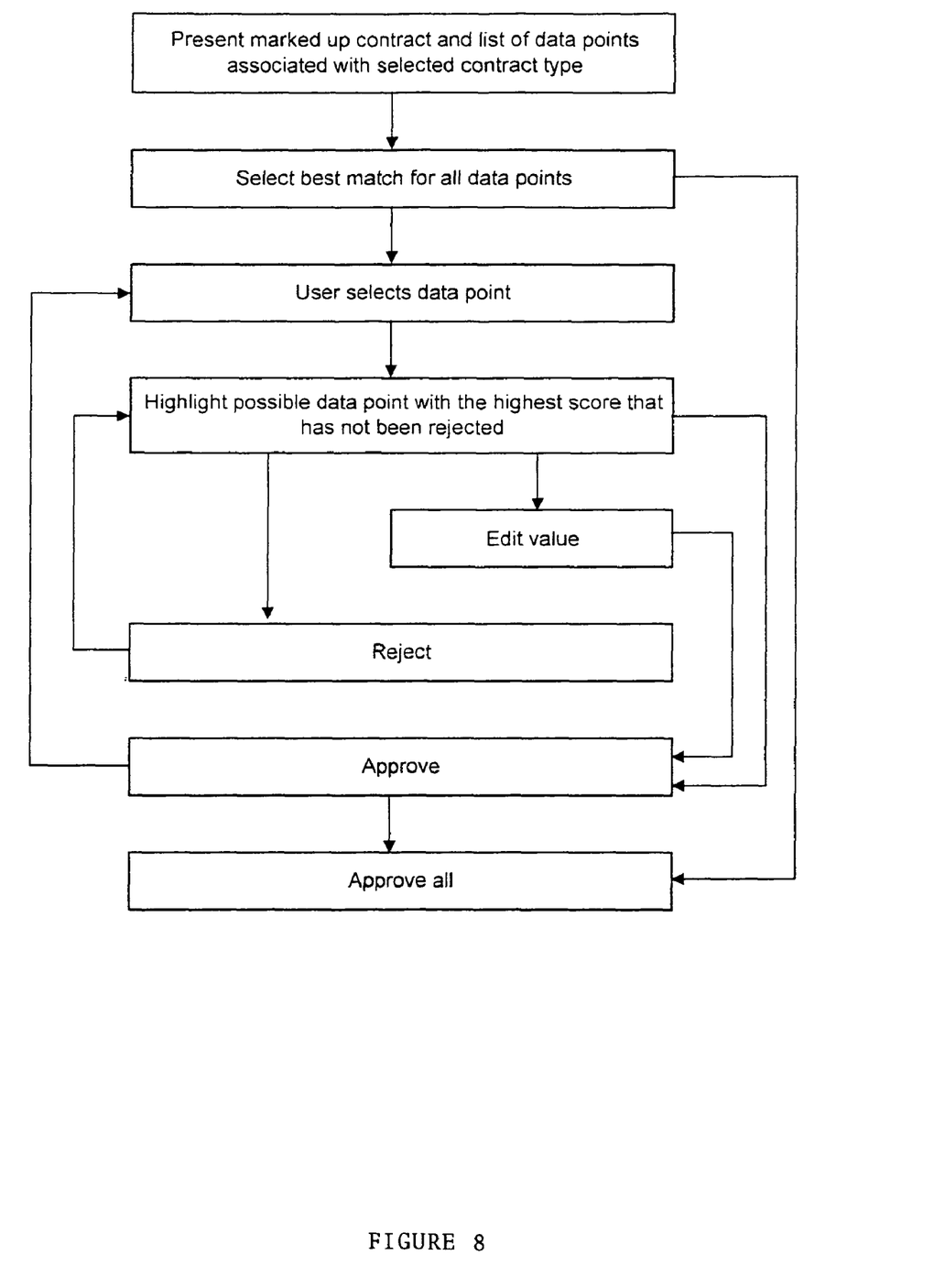
FIG. 8 is a flow chart illustrating the user inspection portion of the method of the present invention.

The user can work his way through the contract template, examining each selection. He has the following choices of operation, as shown in FIG. 8:

1) Accept system analysis. The user clicks a box to acknowledge that he has examined the selection and accepted it. The acceptance becomes a part of the permanent record, along with the name of the user who has approved the data.
2) Reject system analysis. The user clicks a reject box. If the system has a possible second choice for that Data Point, the system will jump to it. Whatever confidence level display the system is using will drop to a lower level. The user then jumps back to the top of this selection queue (#1 above). If the user rejects all system choices, the user moves to the next step.
3) Pick up a missed Data Point. The user clicks on the Data Point to be located in the template from the Native Template listing, pages through the document until it is found, and then marks it with the pointing device.
4) If the Data Point from the template is not in the document, the user can click "Contract Silent".
5) If there is a Data Point in the externally generated document that is not part of the template from the Native Template database, the user will need to decide whether he wants to create a new template, or modify the existing template from the Native Template database. If he chooses to update the existing template, all existing other contracts that link to that template will have the field filled as "Not yet researched."

More specifically, the contract marked up in the analysis portion of the method is presented to the user, either side-by-side or floating over the list of Data Points from the template previously selected from the Native Template database. Each of the Data Points from the list is selected in turn. The system will highlight the highest ranked Data Point and location marked in the analysis process, using the Evaluation Score as an indication of the Confidence Level to user.

The user then selects one of the following options. He may select APPROVE, mark the Data Point as approved and move to the next Data Point. He may select EDIT, use the pointing device to adjust the location noted for the Data Point and then APPROVE.

He may select CYCLE/REJECT. If the user rejects the Possible Data Point, or wishes to examine the contract for other optional Possible Data Points, if additional but lower Evaluation Scored locations exist from the analysis process, he may highlight the next highest score in the Parsing Results table, move to a new Possible Data Point location in the contract, update the Confidence Level to user and cycle through the acceptance options again.

The user may select REJECT. If the user rejects all of the marked-up Possible Data Points, the Possible Data Point mark up for the current Data Point is deleted. The user may now (optionally) move through the contract to find the location of the contract elements that match the Data Point and manually mark them with the pointing device.

The user now has a contract template filled in for the externally generated document. He may at this point even be able to recreate a native text version of the contract with the same meaning as the externally generated text version, but created using his preferred language and format.

It will now be appreciated that the present invention relates to a computer-implemented method for analyzing externally generated documents in a document management system that is capable of parsing plain text documents, that is, documents that have not been pre-formatted or pre-analyzed for computer interaction or machine processing.

The method employs recognition of text coincidence. It takes advantage of the fact that certain special use documents can be grouped by type with a common purpose and that the documents within a particular group will have a relatively limited and specialized vocabulary in common. Further, the structure and topic headings in the document are used in the analysis process. Elements of the text are weighted to select the most likely location of the elements within the document.

In addition, the method of the present invention has the capacity to "learn" from multiple exposures of similar documents to increase its ability to analyze previously unseen variations in the documents.

While only a single preferred embodiment of the present invention has been disclosed for purposes of illustration, it is obvious that many modifications and variations could be made thereto. It is intended to cover all of those modifications and variations which fall within the scope of the present invention, as set forth in the following claims:

We claim:

1. A computer implemented method for analyzing an externally generated document for use in a document management system of the type having a Native Template database including a list of templates for one or more types of documents having common characteristics and a Conversion Database including a list of one or more data points associated with each listed document type, wherein each data point is of a particular Data Type, for example, a "number", "date", 'text" or the like, one or more Descriptive Text entries associated with each listed data point, and Proximity information which describes the location of the data point in relation to the Descriptive Text, the method comprising the steps of:

(a) introducing the externally generated document into the system;
   (b) indexing the externally generated document by recording the locations of words, sentences, paragraphs, and sections within the document;

(c) selecting a document type from the Native Template database that has characteristics in common with the externally generated document;

(d) selecting a data point from the template;

(e) searching the introduced document for Possible Data Points based on the Data Type of the selected data point in the Conversion Database;

(f) obtaining Proximity range information from the Conversion Database for the Descriptive Text entries associated with the selected data point;

(g) determining whether Possible Data Point values for the selected data point are located within the Proximity range for each Descriptive Text entry, using the index information created in (b);

(h) if Possible Data Point values for the selected data point are located within the Proximity range for a Descriptive Text entry, indicating the probability that a Possible Data Point that is the sought Data Type and that the Possible Data Point is located within the Proximity range of a Descriptive Text is therefore likely to be the sought Data Point, calculating a cumulative Evaluation Score for each Possible Data Point value based on its proximity to each Descriptive Text entry, or if no Possible Data Point values for the selected data point are located within the Proximity range for a Descriptive Text entry, leaving the Evaluation Score for that Possible Data Point value unchanged;

(i) recording the Possible Data Point with the highest score above zero that has been accepted by the user;

(j) upon user acceptance of a Possible Data Point, storing additional Descriptive Text entries in the Conversion Database, said stored additional Descriptive Text entries improving the probability of finding a Possible Data Point in other externally generated documents because appropriate Descriptive Text values and Proximity range have been found in the introduced document; and (k) repeating steps (d)-(j) until each data point has been selected.

2. The method of claim 1 further comprising the steps of reviewing the introduced document, identifying and storing section headers and associating the selected data point with the text under the appropriate section header in the Conversion Database.

3. The method of claim 1 further comprising the steps of reviewing the introduced document and identifying and classifying the numbering/lettering system used therein.

4. The method of claim 2 further comprising the steps of adjusting the cumulative Evaluation Score of each Possible Data Point based on its presence within the applicable Section Topic Headers, and whether the hierarchy is regular, incomplete or unknown.

5. The method of claim 1 further comprising the step of assigning a preference to the descriptive text with the highest Evaluation Score, if the text associated with the selected data point is located in more than one location in the introduced document, based on the expectation that the probability that a possible Data Point is of the sought Data Type and is within the Proximity range and is under the Section Topic Header.

6. The method of claim 1 further comprising the step of presenting the Possible Data Points to the user for review.

7. The method of claim 6 further comprising the steps of approving, modifying or rejecting each of the Possible Data Points.

8. The method of claim 1 further comprising the step of setting up the system to determine how a specific variation of a document relates to a template.

9. The method of claim 8 wherein the step of setting up the system comprises the steps of:

(l) introducing a set-up document of the type associated with the template;

(m) presenting the user with the set-up document and template simultaneously;

(n) selecting a data point from the template;

(o) assigning the selected data point to a field in the Conversion Database;

(p) associating the text accompanying the selected data point with the selected data point in the assigned Conversion Database field;

(q) assigning a Data Type to the selected data point in the Conversion Database;

(r) storing a default set of Descriptive Text values and Proximities based on the context of the selected data point value;

(s) storing an additional user-specified set of Descriptive Text values;

(t) assigning proximity information to each user-specified Descriptive Text value; and (u) repeating steps (n) through (t) for each data point selected in the set-up document.

10. The method of claim 9 further comprising the step of introducing multiple set-up documents into the system and repeating steps (l) through (u) for each, said stored additional Descriptive Text entries improving the probability of finding a Possible Data Point in other externally generated documents because appropriate Descriptive Text values and Proximity range have been found in the introduced document.

11. The method of claim 9 further comprising the step of assigning an Expected Value range to the selected data point in the Conversion Database.

12. The method of claim 9 further comprising the step of assigning Section Topic Headers to the selected data point in the Conversion Database.

13. The method of claim 2 wherein the steps of identifying and storing the section headers comprise the steps of:

(v) identifying paragraphs shorter than a given length; and (w) marking each such identified paragraph as a section header.

14. The method of claim 2 wherein the steps of identifying and storing the section headers comprise the steps of:

(x) identifying paragraphs shorter than a given length that end with a hyphen or colon; and (y) marking each such identified paragraph as a section header.

15. The method of claim 14 further comprising the steps of:

(z) identifying paragraphs shorter than a given length with no period;

(aa) identifying paragraphs shorter than a given length with first character capitalized words;

(bb) identifying paragraphs shorter than a given length with all bolded or underlined words; and (cc) determining the frequency of occurrence of (z), (aa) and (bb) in the introduced document, and marking each paragraph if the frequency is over a given value.

16. The method of claim 3 wherein the steps of identifying and classifying the numbering/lettering system used therein comprises the steps of:

(dd) recording the number or letter at the beginning of each paragraph in the introduced document;

(ee) determining the hierarchy type used in the introduced document; and (ff) recording the hierarchy type determination in the Conversion Database.

17. A computer implemented method for analyzing an externally generated document for use in a document management system of the type having a Native Template database including a list of templates for one or more types of documents having common characteristics and Conversion Database including a list of one or more data points associated with each listed document type, one or more descriptive text entries associated with each listed data point, and Proximity information which describes the location of the data point in relation to the Descriptive Text, the method comprising the steps of:
 (gg) setting up the system to determine how a specific variation of a document relates to a template.
 (hh) introducing the externally generated document into the system;
 (ii) analyzing the introduced document by selecting a template from the Native Template database relating to a document type that has characteristics in common with the introduced document, selecting a data point from the template, searching the introduced document for text associated with the selected data point and, if text associated with the selected data point is located, recording the data point and the location of the associated text in the Conversion Database, if text associated with the selected data point is not located, not recording any data;
 (jj) presenting the recorded data to the user for review; and
 (kk) approving, modifying or rejecting the presented data.

18. The method of claim 17 further comprising the steps of reviewing the introduced document, identifying and storing section headers and associating the selected data point with the text under the appropriate section header in the Conversion Database.

19. The method of claim 17 further comprising the steps of reviewing the introduced document and identifying and classifying the numbering/lettering system used therein.

20. The method of claim 19 further comprising the steps of adjusting the cumulative Evaluation Score of each Possible Data Point based on its presence within the applicable Section Topic Headers, and whether the hierarchy is regular, incomplete or unknown.

21. The method of claim 19 further comprising the steps of assigning a numerical score to the data point based upon its location in the introduced document and assigning a preference to the descriptive text with the highest Evaluation Score if the text associated with the selected data point is located in more than one location in the introduced document.

22. The method of claim 17 wherein the step of setting up the system comprises the steps of:
 (ll) introducing a set-up document of the type associated with the template;
 (mm) presenting the user with the set-up document and template simultaneously;
 (nn) selecting a data point from the template;
 (oo) assigning the selected data point to a field in the Conversion Database;
 (pp) associating the text accompanying the selected data point with the selected data point in the assigned Conversion Database field;
 (qq) assigning a Data Type to the selected data point in the Conversion Database;
 (rr) storing a default set of Descriptive Text values and Proximities based on the context of the selected data point value;
 (ss) storing an additional user-specified set of Descriptive text values;
 (tt) assigning proximity information to each user-specified Descriptive Text value; and
 (uu) repeating steps (nn) through (tt) for each data point selected in the set-up document.

23. The method of claim 22 further comprising the step of introducing multiple set-up documents into the system and repeating steps (ll) through (rr) for each document, so as to store said stored additional Descriptive Text values improving the probability of finding a Possible Data Point in other externally generated documents because appropriate Descriptive Text values and Proximity range have been found in the introduced document.

24. The method of claim 22 further comprising the step of assigning an Expected Value range to the selected data point in the Conversion Database, to store the Expected Value range entries improving the probability of finding a Possible Data Point in other externally generated documents because appropriate Descriptive Text values, Proximity range and Expected Value range have been found in the introduced document.

25. The method of claim 18 further comprising the step of assigning a section topic header to the selected data point in the Conversion Database.

26. The method of claim 18 wherein the steps of identifying and storing the section headers comprise the steps of:
 (uu) identifying paragraphs shorter than a given length; and
 (vv) marking each such identified stand-alone paragraph as a section header.

27. The method of claim 18 wherein the steps of identifying and storing the section headers comprise the steps of:
 (ww) identifying paragraphs shorter than a given length that end with a hyphen or colon; and
 (xx) marking each such identified paragraph as a section header.

28. The method of claim 27 further comprising the steps of
 (yy) identifying paragraphs shorter than a given length with no period;
 (zz) identifying paragraphs shorter than a given length with first character capitalized words;
 (aaa) identifying paragraphs shorter than a given length with all bolded or underlined words; and
 (bbb) determining the frequency of occurrence of (zz), (aaa) and (bbb) in the introduced document, and marking each paragraph if the frequency is over a given value.

29. The method of claim 19 wherein the step of identifying and classifying the numbering/lettering system used therein comprises the steps of:
 (ccc) recording the number or letter at the beginning of each paragraph in the introduced document;
 (ddd) determining the hierarchy type used in the introduced document; and
 (eee) recording the hierarchy type determination in the Conversion Database.

* * * * *